US012811448B2

(12) United States Patent
Strnisnik et al.

(10) Patent No.: US 12,811,448 B2
(45) Date of Patent: Nov. 24, 2026

(54) PERMANENT MAGNET ROTOR AND METHOD FOR MANUFACTURING SAME

(71) Applicant: MAHLE International GmbH, Stuttgart (DE)

(72) Inventors: Andraz Strnisnik, Trojane (SI); David Gorkic, Sempeter pri Gorici (SI); Mitja Zavadlav, Sempeter pri Gorici (SI); Tadej Kamnikar, Ljubljana (SI)

(73) Assignee: Mahle International GmbH (DE)

( * ) Notice: Subject to any disclaimer, the term of this patent is extended or adjusted under 35 U.S.C. 154(b) by 177 days.

(21) Appl. No.: 18/437,223

(22) Filed: Feb. 8, 2024

(65) Prior Publication Data

US 2024/0275226 A1 Aug. 15, 2024

(30) Foreign Application Priority Data

Feb. 9, 2023 (EP) .................................... 23155820

(51) Int. Cl.
*H02K 1/2791* (2022.01)
*H02K 5/173* (2006.01)
(Continued)

(52) U.S. Cl.
CPC ......... *H02K 1/2791* (2022.01); *H02K 5/1735* (2013.01); *H02K 7/085* (2013.01); *H02K 15/03* (2013.01); *H02K 21/22* (2013.01)

(58) Field of Classification Search
CPC ...... H02K 1/2791; H02K 15/03; H02K 21/22; H02K 5/1735; H02K 7/085; H02K 7/086
See application file for complete search history.

(56) References Cited

U.S. PATENT DOCUMENTS

2010/0133927 A1 6/2010 Zhang
2020/0244114 A1* 7/2020 Tschida .................. H02K 29/08
2023/0412054 A1* 12/2023 Schmidt ............... H02K 15/022

FOREIGN PATENT DOCUMENTS

CN 110445274 A * 11/2019 ............. F04D 25/08
CN 114221467 A 3/2022
(Continued)

OTHER PUBLICATIONS

English abstract for FR-2503950.
(Continued)

*Primary Examiner* — Christopher M Koehler
*Assistant Examiner* — Ethan Nguyen Vo
(74) *Attorney, Agent, or Firm* — Fishman Stewart PLLC

(57) ABSTRACT

A permanent magnet rotor for a motor is disclosed. The rotor includes a generally cylindrical outer section and a bearing section arranged radially inwards of the cylindrical outer section for rotatably supporting the rotor. The cylindrical outer section and the bearing section are connected by a generally radially extending cover wall. The cylindrical outer section, the bearing section and the radially extending cover wall define at least partly a space for receiving a stator. The cylindrical outer section includes an annular ring of a magnetic material, a plurality of annularly disposed magnets and an inner wall, the inner wall having a substantially cylindrical inner surface. Each magnet has a first and a second end in a circumferential direction and is provided with a radially inwards facing surface having a central section and first and second tapered end sections in the circumferential direction.

20 Claims, 4 Drawing Sheets

(51) Int. Cl.

| | |
|---|---|
| ***H02K 7/08*** | (2006.01) |
| ***H02K 15/03*** | (2025.01) |
| ***H02K 21/22*** | (2006.01) |

(56) References Cited

FOREIGN PATENT DOCUMENTS

| | | | | | |
|---|---|---|---|---|---|
| DE | 102015203995 | A1 | * | 9/2016 | ........... H02K 49/102 |
| EP | 3926791 | A1 | * | 12/2021 | ........... H02K 1/2788 |
| FR | 2503950 | A1 | * | 10/1982 | ............. H02K 1/279 |
| JP | 2022159610 | A | * | 10/2022 | ............. H02K 15/03 |
| KR | 20210027865 | A | | 3/2021 | |
| WO | 2013058100 | A1 | | 4/2013 | |

OTHER PUBLICATIONS

English abstract for KR-20210027865.
English abstract for CN-114221467.
English abstract for CN-110445274.
EP Search Report for EP-23155820.6, dated Jul. 18, 2023.

* cited by examiner

PERMANENT MAGNET ROTOR AND METHOD FOR MANUFACTURING SAME

CROSS-REFERENCE TO RELATED APPLICATION

This application claims priority to European Patent Application No. 23155820.6 filed on Feb. 9, 2023, the contents of which are hereby incorporated by reference in its entirety.

TECHNICAL FIELD

The invention relates to a permanent magnet rotor.

The invention furthermore relates to a method for manufacturing a permanent magnet rotor.

BACKGROUND

A known prior art permanent magnet rotor is disclosed in US2010133927A1. The rotor is an external rotor comprising an annular side wall, an end cover directly connected to said annular side wall and a cavity formed between said side wall and said end cover. A plurality of openings are formed in the side wall and a plurality of magnetic tiles are received in the openings. A magnetic yoke shell is also disposed against said side wall, wherein said side wall and said end cover are integrally formed by injection molding.

SUMMARY

The permanent magnet rotor according to the invention as defined in claim 1 has the advantage of providing an improved fixing of the magnets to the rotor, or at least provides an alternative to known fixing arrangements or methods.

This object is achieved according to a first aspect of the invention with a permanent magnet rotor for a motor, the rotor comprising a generally cylindrical outer section and a bearing section arranged radially inwards of the generally cylindrical outer section for rotatably supporting the rotor, wherein the generally cylindrical outer section and the bearing section are connected by a generally radially extending cover wall, wherein the generally cylindrical outer section, the bearing section and the generally radially extending cover wall define at least partly a space for receiving a stator, the generally cylindrical outer section comprising: an annular ring made out of a magnetic material, a plurality of annularly disposed magnets arranged radially inwards of said annular ring and an inner wall arranged radially inwards of said magnets and having a substantially cylindrical inner surface, wherein each magnet has a first and a second end in the circumferential direction and is provided with a radially inwards facing surface having a central section and first and second tapered end sections in the circumferential direction, wherein the thickness of the inner wall is substantially constant in the central section and increases in the first and second end sections towards the first and second ends of the magnet respectively, wherein the inner wall is formed by overmolding the plurality of magnets with a polymer material.

The magnets are thus fixed to the annular ring via the overmolding of the polymer material.

The substantially cylindrical inner surface of the inner wall may contain grooves or recesses formed during molding due to the tooling pins holding the magnets against the annular ring.

The terms "circumferential" and "radial" are used in relation to a rotation axis of the rotor.

The annular ring can be made for example out of steel forming a magnetic yoke.

Due to the shape of the magnets with tapered end sections, the magnets can be fixed to the annular ring without the use of adhesive, as the overmolding polymer material can flow over the magnets to cover the entire inner surface of the generally cylindrical outer section. The tapered sections of the magnets facilitate the flow of the overmolding polymer material to the center section of the magnets, thus reducing the necessary thickness of the polymer material covering the magnets and in turn reducing the weight of the rotor.

The overmolding polymer can in one embodiment completely enclose the magnets and the annular ring in order to protect these parts from contact with unwanted elements.

The central section of the magnet extends over at least 40% of the magnet in the circumferential direction. The first and/or second tapered end section extends over at least 10% of the magnet in the circumferential direction. This ratio of tapered end section to non-tapered central section has been found to provide, when overmolded with the polymer material, a sufficient fixing of the magnet to the annular ring whilst enabling the covering of the entire magnet surface with a thin layer of polymer in order to reduce weight and minimizing the gap between the magnets and the stator.

The bearing section has a central opening for receiving a rotationally fixed shaft. The bearing section can be supported on the fixed shaft by two axially spaced rolling element bearings.

In one embodiment the bearing section comprises a bearing sleeve made out of metal for receiving an outer bearing race for one of the rolling element bearings. The bearing sleeve can have a profiled radial outer surface. The bearing section can additionally or alternatively comprise an outer bearing race of one of the rolling-element bearings.

Advantageously, the annular ring, the magnets and at least one of the bearing sleeve or the outer bearing race are overmolded in one step by a polymer, whereby the generally radially extending cover wall is formed out of the polymer in the same step. By overmolding the magnets and the bearing parts in one step to form the rotor, additional assembly steps e.g. fixing the magnets to the annular ring with adhesive and attaching bearing parts can be eliminated.

In the same molding step a plurality of metallic threaded inserts for attaching a fan can be provided in the radially extending cover wall such that the threaded inserts are fixed in the cover wall by overmolding.

Alternatively the annular ring made out of a magnetic material, preferably steel, can be provided with threaded attachment points for attaching a fan.

In another aspect a cooling fan motor is provided comprising a stator having a stack of steel laminations and a plurality of winding coils arranged in circumferentially spaced slots in the steel laminations and a permanent magnet rotor according to any of the above embodiments of the invention.

A cooling fan is attached to the radially extending cover wall via the threaded inserts molded into the radially extending cover wall.

In a further aspect of the invention, a method for manufacturing a permanent magnet rotor is provided, the permanent magnet rotor comprising a generally cylindrical outer section and a bearing section arranged radially inwards of the generally cylindrical outer section, whereby the generally cylindrical outer section and the bearing section are connected by a generally radially extending cover wall, the generally cylindrical outer section, the bearing section and the generally radially extending cover wall defining at least partly a space for receiving a stator, the method comprising the steps of:

a) positioning an annular ring made out of a magnetic material in a molding tooling.

b) positioning a plurality of annularly disposed magnets radially inwards of said annular ring in the molding tooling, whereby each magnet has a first and a second end in the circumferential direction and is provided with a radially inwards facing surface having a central section and first and second tapered end sections in the circumferential direction, whereby the distance of the radially inwards facing surface to the center of rotation of the rotor increases in the tapered sections towards the respective first and second circumferential ends, c) positioning a metallic bearing sleeve for receiving an outer bearing race in the molding tooling, d) overmolding the annular ring, the plurality of annularly disposed magnets and the metallic bearing sleeve in a single step with a polymer material to form the generally cylindrical outer section, the bearing section and the generally radially extending cover wall, wherein the generally cylindrical outer section has a substantially cylindrical radially inner surface formed with the polymer material.

In one embodiment, before the overmolding step d), a plurality of metallic threaded inserts for attaching a fan are positioned in the molding tooling such that they are fixed in the radially extending cover wall formed in the overmolding step d). Preferably at least three of such threaded inserts are positioned in the molding tooling.

In another embodiment, before the overmolding step d) an outer bearing race is positioned in the molding tooling such that it is overmolded by the polymer material in the overmolding step d).

By incorporating the metallic threaded inserts and/or the bearing outer race in the overmolding step d) the assembly steps of the rotor with fan are reduced. For example, press-fitting of bearing parts can be avoided.

The generally radially extending cover wall can be advantageously formed without metallic reinforcement. This is achieved by increasing the thickness of the cover wall and/or providing the cover wall with reinforcing ribs. In one embodiment the reinforcing ribs extend radially from the central opening in the cover wall to each of the plurality of metallic threaded inserts.

The features of the magnets described with respect to the rotor according to the invention can apply equally to the magnets used in the above method.

BRIEF DESCRIPTION OF THE DRAWINGS

Embodiments will now be described by way of example only with reference to the accompanying drawings, in which.

DETAILED DESCRIPTION

Figure 1:
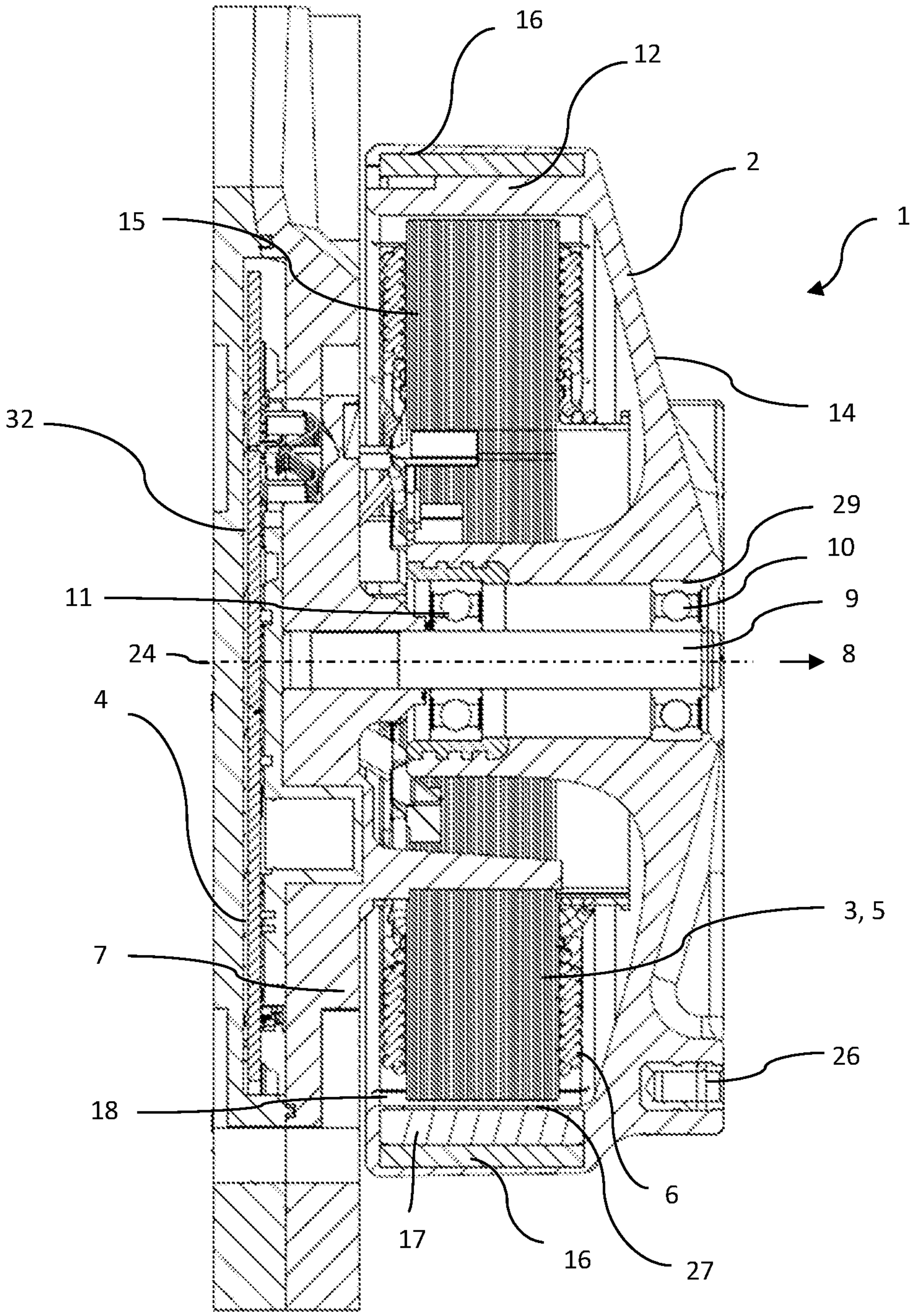
FIG. 1 is a sectional side view of a cooling fan motor according to the invention.

FIG. 1 shows a sectional side view of a cooling fan motor 1 according to the invention. The cooling fan motor 1 can be used for example for cooling internal combustion engines or vehicle batteries. The cooling fan motor 1 comprises a permanent magnet rotor 2, a stator 3 and a control unit 4. The stator 3 comprises a stack of steel laminations 5 with circumferentially spaced slots for receiving winding coils 6. The stator 3 is attached to the housing 7 of the control unit 4. The control unit 4 is arranged on a first side of the stator 3 in the axial direction 8. The control unit 4 comprises a control circuit board 32, power switches and capacitors for supplying multi-phase current to the stator coils 6.

A shaft 9 is fixedly attached to control unit housing 7 or is integrally formed therewith. The permanent magnet rotor 2 is arranged to rotate around the shaft 9. For this purpose two rolling bearings 10, 11 are arranged at opposite axial ends of the rotor 7.

The permanent magnet rotor 2 comprises a generally cylindrical outer section 12 and a bearing section 13 arranged radially inwards of the generally cylindrical outer section for rotatably supporting the rotor 2. The generally cylindrical outer section 12 and the bearing section 13 are connected by a generally radially extending cover wall 14, which is arranged on a second side of the stator 3 in the axial direction 8 opposite to the control unit 4. The generally cylindrical outer section 12, the bearing section 13 and the generally radially extending cover wall 14 define at least partly a space 15 for receiving the stator 3, such that the stator 3 is arranged radially between the generally cylindrical outer section 12 and the bearing section 13. The bearing section 13 has a central opening 31 for receiving the shaft 9, such that the rotor 2 is supported in the shaft via the two rolling bearings 10, 11.

The generally cylindrical outer section 12 of the rotor 2 comprises an annular ring 16 made out of a magnetic material, e.g. steel, and a plurality of annularly disposed magnets 17 arranged radially inwards of said annular ring 16, preferably contacting the annular ring 16. An inner wall 18 of the cylindrical outer section 12 is arranged radially inwards of said magnets 17.

Figure 4:
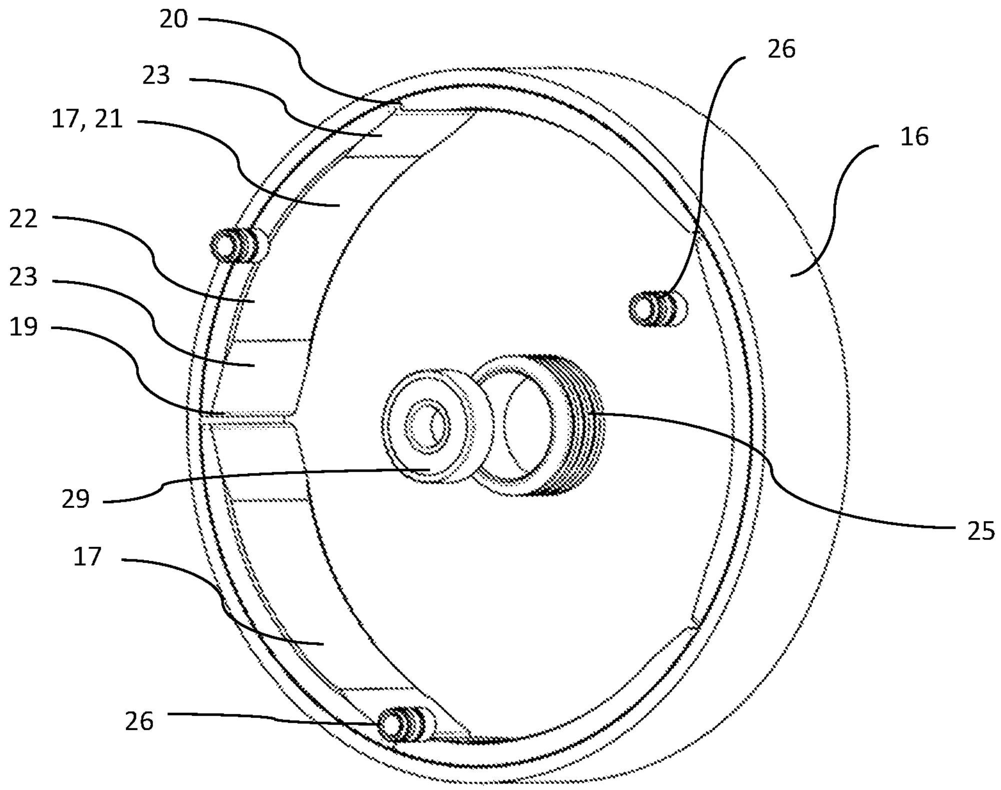
FIG. 4 is a rear perspective view of components of a rotor according to the invention before an overmolding step.

As can be seen in FIG. 4, which shows the components of the rotor 2 before an overmolding step, each magnet 17 has a first end 19 and a second end 20 in the circumferential direction. Each magnet 17 has a central section 22 and first and second tapered end sections 23 in the circumferential direction. The distance of a radially inwards facing surface 21 of the magnets 17 to the rotation axis 24 of the rotor 2 increases in the tapered sections towards the respective first and second circumferential ends 19, 20, whereas the distance of the central section 22 of the radially inwards facing surface 21 to the rotation axis 24 remains constant. The central section 22 of the magnet extends over at least 40% of the magnet 17 in the circumferential direction. The first and second tapered end sections 23 each extend over at least 10% of the magnet in the circumferential direction. This ratio of tapered end section to non-tapered central section has been found to provide, when overmolded with the polymer material, a sufficient fixing of the magnet to the annular ring 16 whilst enabling the covering of the entire magnet surface with a thin layer of polymer in order to reduce weight and minimizing the gap between the magnets 17 and the stator 3.

Figure 2:
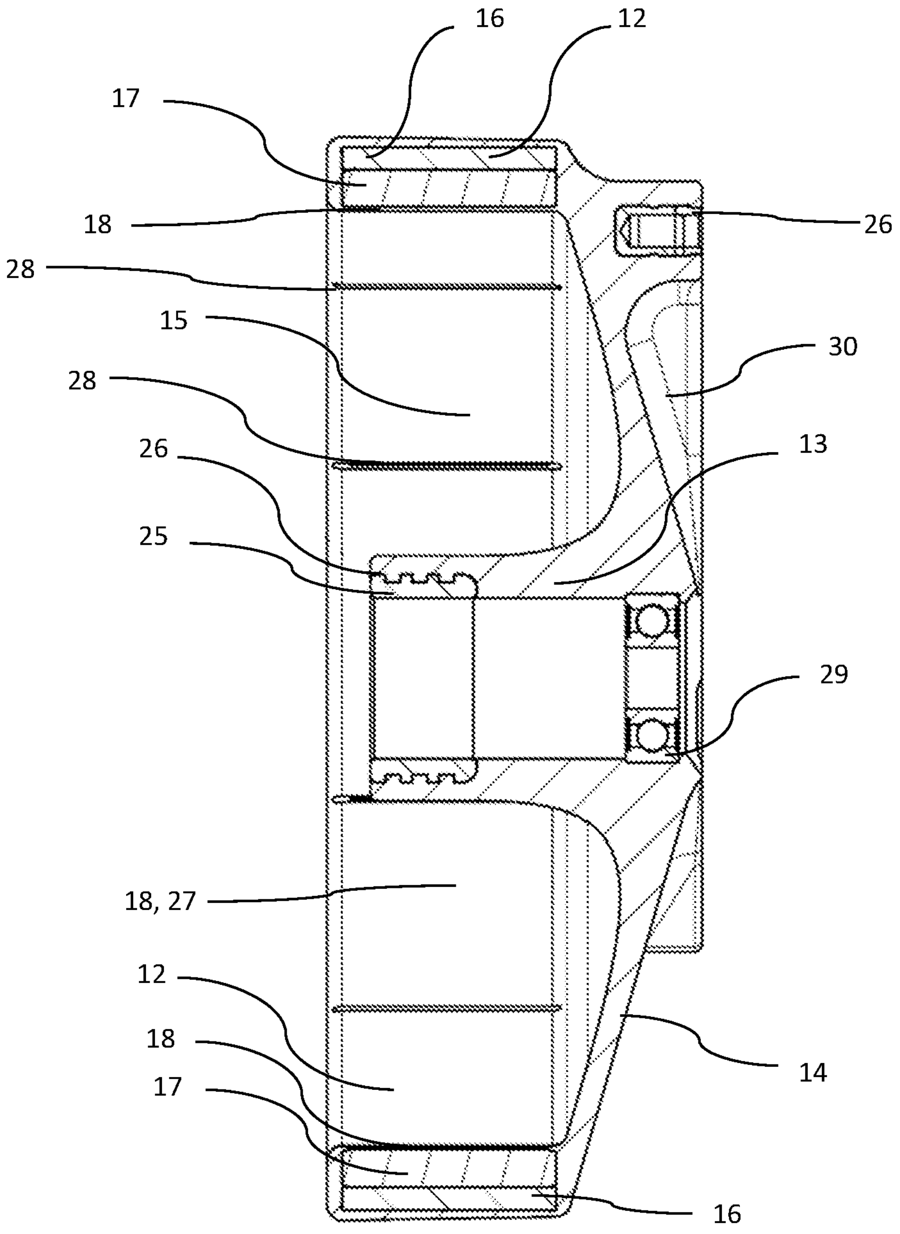
FIG. 2 is a sectional side view of a rotor according to the invention.
Figure 3:
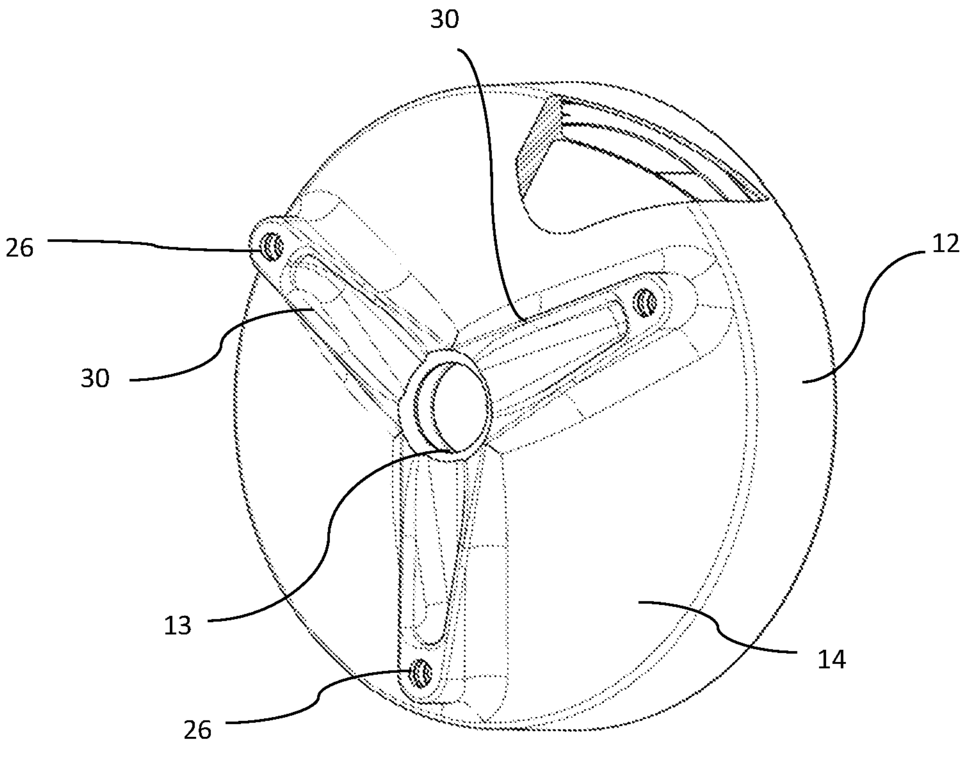
FIG. 3 is a rear perspective view of a rotor according to the invention.

Referring to FIGS. 2 and 4, manufacturing the permanent magnet rotor 2 includes the steps of:

positioning the annular ring 16 made out of a magnetic material in a molding tooling (not shown), positioning the plurality of annularly disposed magnets 17 radially inwards of the annular ring 16 in the molding tooling. The magnets preferably contact the annular ring 16 and are held in position by the tooling such that no adhesive is required for attachment of the magnets 17 to the annular ring 16.

positioning a bearing sleeve 25, preferably out of metal, in the molding tooling, the bearing sleeve 25 being suitable for receiving an outer bearing race of the second rolling bearing 11. The bearing sleeve 25 has a profiled radial outer surface 26.

positioning an outer bearing race 29 of the first rolling bearing 10 in the molding tooling, positioning three metallic threaded inserts 26 for attaching a fan in the molding tooling FIG. 2 shows the above parts positioned in relation to each other before overmolding, the molding tooling is however not shown. After positioning the above parts in a molding tooling they are overmolded in a single step with a polymer material to form the generally cylindrical outer section 12, the bearing section 13 and the generally radially extending cover wall 14. In FIGS. 2 and 3 the rotor 2 is shown after the overmolding step. The generally cylindrical outer section 12 has an inner wall 18 facing the stator 3 formed with the polymer material and having a substantially cylindrical radially inner surface 27. By overmolding at least the magnets 17 and the bearing parts 25, 29 in one step to form the rotor, additional assembly steps e.g. fixing the magnets to the annular ring with adhesive and attaching bearing parts can be eliminated. In the same molding step the plurality of metallic threaded inserts 26 for attaching a fan can be provided in the radially extending cover wall 14 such that the threaded inserts 26 are fixed in the cover wall 14 by overmolding.

The thickness of the inner wall 18 is substantially constant in the area of the central section 22 of the magnets 17 and increases in the area of the first and second tapered end sections 23 of the magnets 17 towards the first and second ends of the magnets 17 respectively.

The inner wall 18 may contain grooves or recesses 28 formed during molding due to the tooling pins holding the magnets 17 against the annular ring 16.

The shape of the magnets 17 with tapered end sections 23 enable the magnets 17 to be fixed to the annular ring 16 without the use of adhesive, as the overmolding polymer material can flow over the magnets 17 to cover the entire inner surface of the generally cylindrical outer section. The tapered sections 23 of the magnets facilitate the flow of the overmolding polymer material to the center section of the magnets, thus reducing the necessary thickness of the polymer material covering the magnets and in turn reducing the weight of the rotor 2.

As shown in FIG. 2, the overmolding polymer substantially completely encloses the magnets 17 and the annular ring 16 in order to protect these parts from contact with unwanted elements.

The generally radially extending cover wall 14 is advantageously formed out of the polymer material without metallic reinforcement. This is achieved by increasing the thickness of the cover wall 14 and/or providing the cover wall with reinforcing ribs 30. In the embodiment shown in FIG. 3 the reinforcing ribs 30 extend radially from the central opening 31 in the rotor 2 to each of the plurality of metallic threaded inserts 26.

The invention claimed is:

1. A permanent magnet rotor for a motor, the rotor comprising:

a generally cylindrical outer section and a bearing section arranged radially inwards of the generally cylindrical outer section for rotatably supporting the rotor, wherein the generally cylindrical outer section and the bearing section are connected by a generally radially extending cover wall, wherein the generally cylindrical outer section, the bearing section and the generally radially extending cover wall define at least partly a space for receiving a stator, the generally cylindrical outer section comprising: an annular ring of a magnetic material, a plurality of annularly disposed magnets arranged radially inwards of said annular ring and an inner wall arranged radially inwards of said plurality of magnets, the inner wall having a substantially cylindrical inner surface, wherein each magnet has a first and a second end in a circumferential direction and is provided with a radially inwards facing surface having a central section and first and second tapered end sections in the circumferential direction, wherein a thickness of the inner wall is substantially constant in the central section and increases in an area of the first and second tapered end sections towards the first and second ends of the magnet respectively, wherein the inner wall is formed by overmolding the plurality of magnets with a polymer material.

2. The permanent magnet rotor according to claim 1, wherein the central section of the magnet extends over at least 40% of the magnet in the circumferential direction.

3. The permanent magnet rotor according to claim 1, wherein the first tapered end section extends over at least 10% of the magnet in the circumferential direction.

4. The permanent magnet rotor according to claim 1, wherein the bearing section comprises a bearing sleeve of metal for receiving an outer bearing race.

5. The permanent magnet rotor according to claim 4, wherein the annular ring, the plurality of magnets and the bearing sleeve are overmolded in one step by a polymer, wherein the generally radially extending cover wall is formed out of the polymer in the same step.

6. The permanent magnet rotor according to claim 5, further comprising a plurality of metallic threaded inserts for attaching a fan provided in the radially extending cover wall, wherein the plurality of threaded inserts are fixed in the cover wall by overmolding.

7. The permanent magnet rotor according to claim 1, wherein the bearing section comprises an outer bearing race.

8. The permanent magnet rotor according to claim 1, wherein the generally radially extending cover wall is formed free of metallic reinforcement.

9. The permanent magnet rotor according to claim 1, wherein the generally radially extending cover wall is provided with reinforcing ribs extending radially from the central opening in the cover wall to each of a plurality of metallic threaded inserts, wherein the plurality of metallic threaded inserts are disposed on a respective one of the reinforcing ribs.

10. The permanent magnet rotor according to claim 1, wherein the first and second tapered end sections taper radially outwardly from the central section to the first and second end, respectively, and wherein the plurality of magnets are arranged such that the first tapered end section of one of the plurality of magnets is arranged circumferentially adjacent to the second tapered end section of another one of the plurality of magnets.

11. A cooling fan motor, comprising:

a stator including a stack of steel laminations and a plurality of coils arranged in circumferentially spaced slots in the steel laminations; and a permanent magnet rotor, the permanent magnet rotor including:

a generally cylindrical outer section and a bearing section arranged radially inwards of the generally cylindrical outer section for rotatably supporting the rotor, wherein the generally cylindrical outer section and the bearing section are connected by a generally radially extending cover wall, wherein the generally cylindrical outer section, the bearing section and the generally radially extending cover wall define at least partly a space for receiving a stator, the generally cylindrical outer section comprising: an annular ring of a magnetic material, a plurality of annularly disposed magnets arranged radially inwards of said annular ring and an inner wall arranged radially inwards of said plurality of magnets, the inner wall having a substantially cylindrical inner surface, wherein each magnet has a first and a second end in a circumferential direction and is provided with a radially inwards facing surface having a central section and first and second tapered end sections in the circumferential direction, wherein a thickness of the inner wall is substantially constant in the central section and increases in an area of the first and second tapered end sections towards the first and second ends of the magnet respectively, wherein the inner wall is formed by overmolding the plurality of magnets with a polymer material.

12. The cooling fan motor according to claim 11, wherein at least one of:

the central section of the magnet extends over at least 40% of the magnet in the circumferential direction; and the first tapered end section extends over at least 10% of the magnet in the circumferential direction.

13. The cooling fan motor according to claim 11, wherein the annular ring, the plurality of magnets and the bearing sleeve are overmolded by a polymer.

14. The cooling fan motor according to claim 13, further comprising a plurality of metallic threaded inserts for attaching a fan provided in the radially extending cover wall, wherein the plurality of threaded inserts are fixed in the cover wall by overmolding.

15. The cooling fan motor according to claim 14, wherein the generally radially extending cover wall is provided with reinforcing ribs extending radially from the central opening in the cover wall to each of the plurality of metallic threaded inserts.

16. A method for manufacturing a permanent magnet rotor, the permanent magnet rotor including a generally cylindrical outer section and a bearing section arranged radially inwards of the generally cylindrical outer section, wherein the generally cylindrical outer section and the bearing section are connected by a generally radially extending cover wall, the generally cylindrical outer section, the bearing section and the generally radially extending cover wall defining at least partly a space for receiving a stator, the method comprising the steps of:

a. positioning an annular ring made out of a magnetic material in a molding tooling, b. positioning a plurality of annularly disposed magnets radially inwards of said annular ring in the molding tooling, wherein each magnet has a first and a second end in a circumferential direction and is provided with a radially inwards facing surface having a central section and first and second tapered end sections in the circumferential direction, whereby a distance of the radially inwards facing surface to the center of rotation of the rotor increases in the tapered sections towards the respective first and second circumferential ends, c. positioning a metallic bearing sleeve for receiving an outer bearing race in the molding tooling, d. overmolding the annular ring, the plurality of annularly disposed magnets and the metallic bearing sleeve in a single step with a polymer material to form the generally cylindrical outer section, the bearing section and the generally radially extending cover wall, wherein the generally cylindrical outer section has a substantially cylindrical radially inner surface formed with the polymer material, and wherein a thickness of the inner wall is substantially constant in the central section and increases in an area of the first and second tapered end sections towards the first and second ends of the magnet respectively.

17. The method according to claim 16, wherein before the overmolding step d) a plurality of metallic threaded inserts for attaching a fan are positioned in the molding tooling such that they are fixed in the radially extending cover wall formed in the overmolding step d).

18. The method according to claim 16, wherein before the overmolding step d) an outer bearing race is positioned in the molding tooling such that it is overmolded by the polymer material in the overmolding step d).

19. The method according to claim 16, wherein the central section of the magnet extends over at least 40% of the magnet in the circumferential direction.

20. The method according to claim 16, wherein the first tapered end section extends over at least 10% of the magnet in the circumferential direction.

* * * * *